April 20, 1926.
J. L. IRWIN
1,581,952
CHAIN TIGHTENER AND FASTENER
Filed June 23, 1925
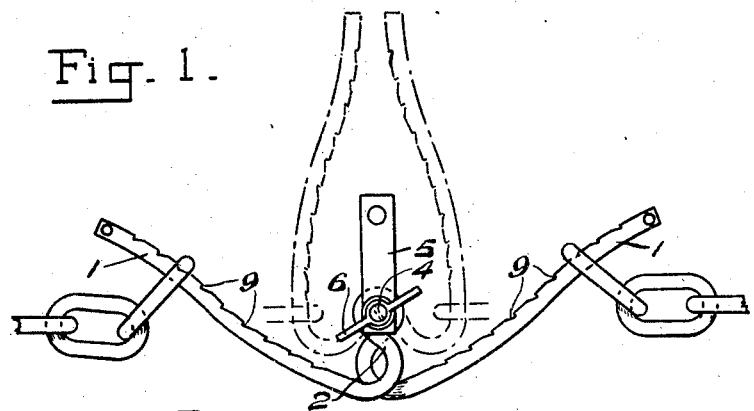
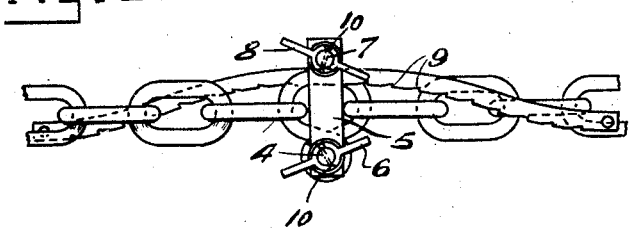
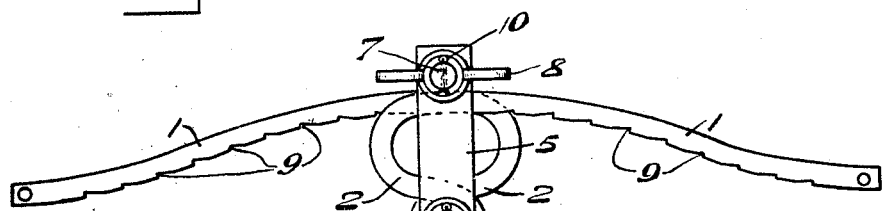
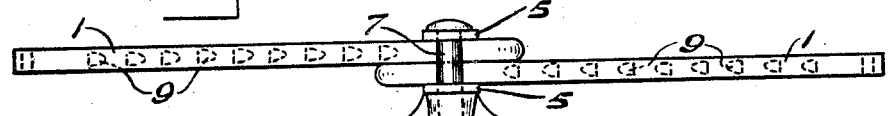
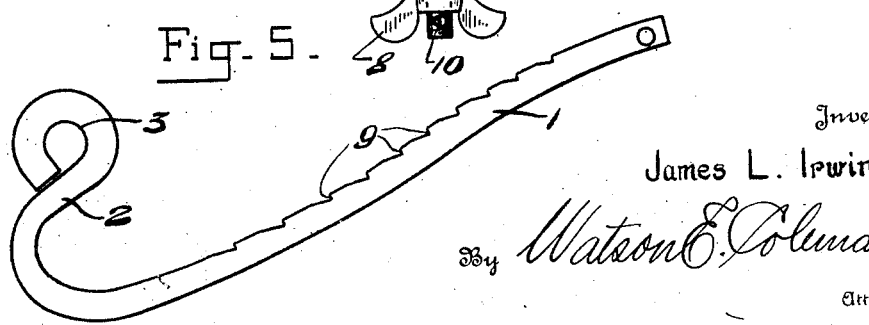
Inventor
James L. Irwin
By Watson E. Coleman.
Attorney Patented Apr. 20, 1926.

1,581,952

UNITED STATES PATENT OFFICE.

JAMES L. IRWIN, OF FAIRPORT, IOWA.

CHAIN TIGHTENER AND FASTENER.

Application filed June 23, 1925. Serial No. 39,086.

*To all whom it may concern:*

Be it known that I, JAMES L. IRWIN, a citizen of the United States, residing at Fairport, in the county of Muscatine and State of Iowa, have invented certain new and useful Improvements in Chain Tighteners and Fasteners, of which the following is a specification, reference being had to the accompanying drawings.

This invention relates to certain improvements in chain tighteners and fasteners and it is an object of the invention to provide a device of this general character especially designed and adapted for use in connection with a side chain of an anti-skidding device.

Another object of the invention is to provide a device of this general character comprising two elongated members supported for relative swinging movement each of which being adapted to be inserted through a link of a chain whereby swinging movement of the members in one direction permits effective tightening of the chain together with means coacting with said members for holding or fastening the chain in such adjustment.

The invention consists in the details of construction and in the combination and arrangement of the several parts of my improved chain tightener and fastener whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a chain tightener and fastener constructed in accordance with an embodiment of my invention, a second position being indicated by broken lines;

Figure 2 is a view in top plan of the structure as illustrated in Figure 1;

Figure 3 is an enlarged view in side elevation showing the device in position when locked;

Figure 4 is a view in top plan of the structure as illustrated in Figure 3;

Figure 5 is a view in elevation of one of the elongated members as herein employed.

As disclosed in the accompanying drawings, my improved device comprises two substantially duplicate members 1 each being of desired length and slightly sigmoidal in form and one end portion being returned to provide a relatively short arm 2 terminating in an eye 3. In assembly, the members are oppositely arranged or with the arms 2 inwardly disposed and the eye members 3 side by side. Disposed through the eye members 3 is a headed shank or bolt 4 which is also disposed through the end portion of a pair of plates 5. Threaded upon the free end portion of the headed shank or bolt 4 is a wing nut 6 for a purpose to be hereinafter referred to.

As herein disclosed, the plates 5 are of a length in excess of that of the arms 2 although this at all times is not essential. The opposite end portions of the plates 5 are adapted to have removably inserted therethrough a second headed shank or bolt 7 with one end portion of which is engaged a wing nut 8.

When it is desired to tighten and fasten a side chain of an anti-skidding device with my improved device, the bolt 7 is removed and the members 1 are disposed in the same general direction with each of the members inserted through a desired link in the side chain. Inward and upward swinging movement is then imparted to both of the members 1 which results in the chain links riding or slipping inwardly of the members 1 until engaged within the hook portions thereof as provided by the return arms 2. This action causes the chain to be tightened and when said members have been brought to a position whereby they extend in substantially opposite directions, the wing nut 6 is tightened causing the members 1 to be effectively maintained in such position. To further hold the members 1 in this last position, the second headed shank or bolt 7 is inserted through the plates 5 and outwardly of but in close proximity to the inner portions of said members 1 whereby the same are effectively held against swinging movement under the influence of the strain imposed thereon by the chain.

Disposed lengthwise of the inner faces of the members 1 are the notches 9 which serve to provide effective means to hold the links against outward slippage along said members 1 during a tightening operation.

In order to prevent displacement of the applied nuts 6 and 8 the pins 10 may be employed.

From the foregoing description it is thought to be obvious that a chain tightener and fastener constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A chain tightener and fastener comprising a pair of elongated members, each having an end portion continued by a return arm, means for pivotally connecting the free end portions of said arms, about which said arms are swingable from a position where the members substantially aline and are uncrossed to a position where the members substantially aline and have their end portions crossed, the end portions of the members and the return arms thereof combining in the last named position to produce an eye and means for holding said members against relative swinging movement when in the last named position.

2. A chain tightener and fastener comprising two elongated members each having an end portion continued by a return arm, the free extremity of which being provided with an eye, a pivot member disposed through the eyes of the arms to permit the first named members to have relative swinging movement, plates engaged with said pivot member at the outer sides of the arms, and means detachably engaged with the plates to overlie the inner ends of the first named members when in one position to hold the same against substantial relative movement.

3. A chain tightener and fastener comprising two elongated members each having an end portion continued by a return arm, the free extremity of which being provided with an eye, a pivot member disposed through the eyes of the arms to permit the first named members to have relative swinging movement, plates engaged with said pivot member at the outer sides of the arms, means detachably engaged with the plates to overlie the inner ends of the first named members when in one position to hold the same against substantial relative movement, and means coacting with the pivotal member for holding said first named members against relative movement.

In testimony whereof I hereunto affix my signature.

JAMES L. IRWIN.